A. N. HADLEY.
HARVESTER.
APPLICATION FILED JAN. 19, 1903.

967,904.

Patented Aug. 23, 1910.
7 SHEETS—SHEET 1.

Fig. 1.

Witnesses
Frank A. Sahle
J. A. Walsh.

Inventor
Artemus N. Hadley
By
Bradford Hood
Attorneys

A. N. HADLEY.
HARVESTER.
APPLICATION FILED JAN. 19, 1903.

967,904.

Patented Aug. 23, 1910.
7 SHEETS—SHEET 3.

*Fig. 3.*

Inventor
Artemus N. Hadley

Witnesses

By
Bradford Hood
Attorneys

A. N. HADLEY.
HARVESTER.
APPLICATION FILED JAN. 19, 1903.

967,904.

Patented Aug. 23, 1910.
7 SHEETS—SHEET 4.

Witnesses
Walter Troemel.
Thomas W. McMeans

Inventor
Artemus N. Hadley.
By Bradford Hood.
Attorneys

A. N. HADLEY.
HARVESTER.
APPLICATION FILED JAN. 19, 1903.

967,904.

Patented Aug. 23, 1910.
7 SHEETS—SHEET 7.

Witnesses
Frank A. Fahle
J. A. Walsh.

Inventor
Artemus N. Hadley
By
Bradford Hood
Attorneys

UNITED STATES PATENT OFFICE.

ARTEMUS N. HADLEY, OF INDIANAPOLIS, INDIANA.

HARVESTER.

967,904.  Specification of Letters Patent.  Patented Aug. 23, 1910.

Application filed January 19, 1903. Serial No. 139,697.

*To all whom it may concern:*

Be it known that I, ARTEMUS N. HADLEY, a citizen of the United States, residing at Indianapolis, in the county of Marion and State of Indiana, have invented certain new and useful Improvements in Harvesters, of which the following is a specification.

In the operation of that type of corn harvesters, the characteristic feature of which is a rotatable shock forming table having a central stalk receiving support operating in conjunction therewith, as particularly described and claimed in my Patent No. 399,988, issued March 19, 1889, some means must be provided by which the formed shock may be lifted from the shock-forming table and deposited upon the ground.

The object of my invention is to provide an efficient mechanism by which a shock may be easily and quickly transferred from the shock forming table to the ground, said mechanism being so designed that the mechanism will be comparatively short even for tall corn, and also such as to assist in the production of a proper shock. It is to be understood, however, that the lifting mechanism is not necessarily limited, in its use, to corn harvesters.

The accompanying drawings illustrate my invention as applied to a corn harvester.

While the compressing and lifting mechanism has been shown in connection with a particular form of harvester, it is to be understood that I do not limit myself to such use, and that much of the mechanism may be used in connection with any machine designed or intended to be used in the formation of shocks or bundles where the shock or bundle may be embraced and lifted bodily to be transferred from one point to another.

In the drawings, 25 indicates a main frame supported by the usual "bull-wheel" 26 and supporting wheel 27. Mounted upon frame 25, so as to rotate in a substantially horizontal plane, is a shock forming table 28 driven by any suitable chain of gearing 29 from the bull-wheel 26, or by any other suitable means. Frame 25 also carries cutting mechanism 30 arranged in front of table 28 so that the stalks after being severed by the cutting mechanism may pass from thence to the shock forming table.

Erected upon the frame 25 at one side of table 28 is a supplemental frame 31 provided at its upper end with a cross arm 32 which extends out over the center of table 28. Rotatably mounted upon the arm 32, so as to rotate in a substantially horizontal plane, is a gear 33 provided in its center with an opening through which may pass vertically a core or rod 34, said core or rod being of any desired cross-section, in the present case being shown as square tubing. Gear 33 carries a series of upwardly projecting ears 35 which are arranged concentrically with relation to a point eccentric to the center of the gear, said ears forming a bearing for an annulus 36 provided upon its upper face with teeth adapted to mesh with and rotate a gear 37. Gear 37 is carried by a shaft 38 mounted in suitable bearing ears 39 formed upon gear 33, and said shaft carries a drum 40 which lies alongside of core 34. Drum 40 carries a rope or cable 41 one end of which passes down alongside of core 34 and is fastened thereto at a point near its lower end. Ring 36 also has formed in its periphery a groove 42 adapted to receive an operating cable 43 which is passed around the ring and led from thence over idlers 44, and thence downward, a weighted idler pulley 45 being supported in the bight of the cable. Gear 33 may be rotated by any suitable means, either by reason of a positive connection between core 34 and table 28, or by separate means such for instance as a worm 46, shaft 47, a sprocket wheel 47' carried by said shaft 47 and receiving a driving belt 48 which extends between said sprocket wheel and the sprocket wheel 29' carried by a shaft 290 driven by a sprocket chain 291 from a shaft 292 which is connected to the bull wheel by the sprocket chain 29.

Erected upon frame 25 to one side of the table 28, and preferably to the rear thereof near the driver's seat, is a hollow mast 50 provided near its upper end with a stationary collar 51 having an arm 52. Rotatably mounted upon mast 50, above and supported upon the collar 51, is a collar 53 provided with an arm 54 having a plurality of openings 55. Collar 53 also carries an arm 56 which, at times, is adapted to engage arm 52. Above collar 53 is a collar 57 also rotatable upon mast 50, and carrying a guide pulley 58. Collar 57 may be integral with collar 53 if desired. Sleeved upon mast 50, below collar 51, is a sleeve 59 provided, if desired, with antifriction rollers 60 engaging the mast. Sleeve 59 is both vertically and angularly movable upon mast 50, and may be held in any desired position by a cam lever 61 carried by the sleeve.

Figures 15, 16:
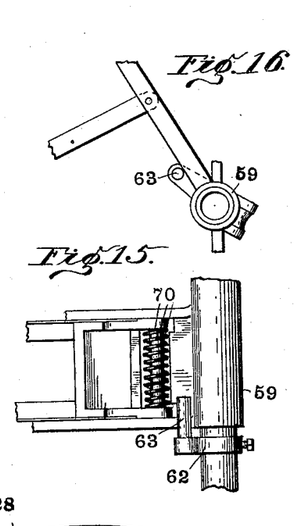
Fig. 15 a vertical detail of a modified connection between the lifting mechanism and the supporting mast.
Fig. 16 a plan view of the parts shown in Fig. 15.

It will be readily understood, of course, that any suitable means may be used for this purpose, as, for instance, the construction shown in Figs. 15 and 16. In this form I mount upon mast 50, below sleeve 59, a vertically and angularly adjustable collar 62 provided with a pin 63 which is adapted to engage a projecting portion of sleeve 59 to restrain rotation thereof so long as the sleeve is not raised to a point above the upper end of the pin.

Sleeve 59 carries a projecting arm 64 which extends normally forward and toward the periphery of table 28, and carries near its outer end, upon the side next the table, a pulley 65. Pivoted upon a vertical axis to the outer end of arm 64 is a phalanx 66 normally urged outward, away from the table, by a spring 67. Secured to the outer end of the phalanx 66 is a tip 68. Pivoted on a vertical axis to arm 64 at a point between the ends of said arm is a phalanx 69 normally urged outward by a spring 70, (Fig. 3) and this phalanx carries, upon that side adjacent the table 28, a pulley 69', while secured to the outside thereof is a pulley 71. Pivoted to the outer end of phalanx 69 is a second phalanx 72 normally urged inward by a spring 73. Mounted between the two phalanges 69 and 72 is a buffer spring 74 which is stronger than spring 73. Phalanx 72 carries upon its inner face, near its joint with phalanx 69, a pulley 75. Pivotally mounted upon a vertical axis at the outer end of phalanx 72 is a third phalanx 76 normally urged inward by a spring 77, said inward movement being restrained at a certain point by a buffer-spring 78. Secured to the inner side of phalanx 76, near its joint with phalanx 72, is a pulley 79. Pivoted on a vertical axis at the outer end of phalanx 76 is a fourth phalanx 80 normally urged inward by a spring 81, and between the two phalanges 76 and 80 is a buffer-spring 82 similar to the spring 78. Adjustably secured to the outer end of phalanx 80 is a tip 83. As clearly shown in Fig. 3, phalanges 69, 72, 76 and 80 are so connected that the outer end of phalanx 80 will lie above the outer end of phalanx 66, so that when desired one may pass over or overlap the other, as shown in Fig. 4.

Figure 3:
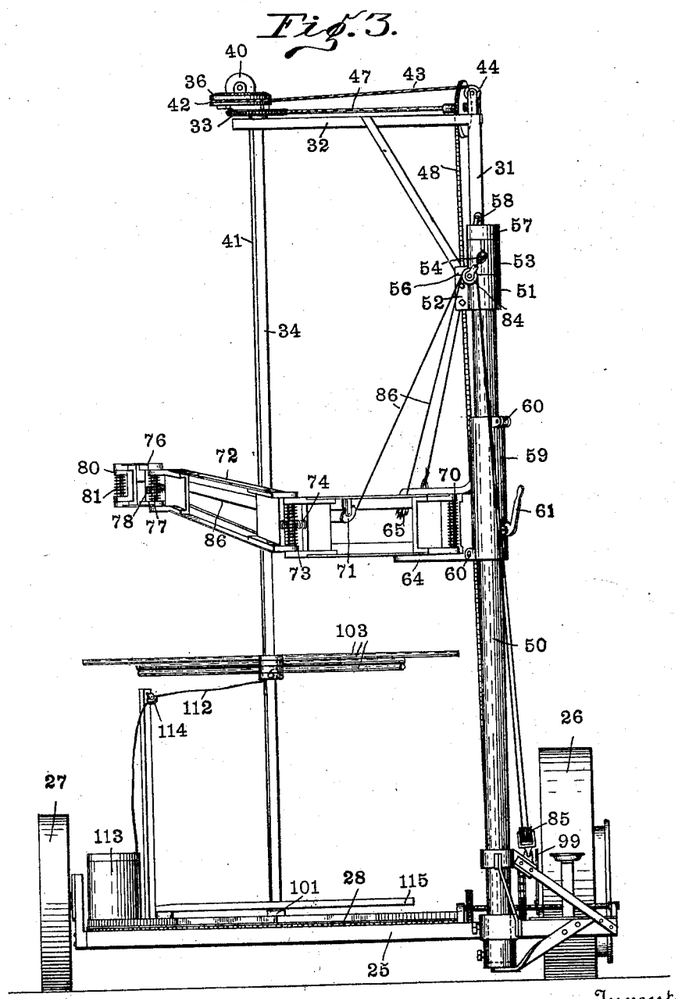
Fig. 3 a rear elevation.

Hung upon arm 54, at any one of the points 55, are two snatch blocks 84 and 84, and secured to frame 25 near the lower end of mast 50 is a double snatch-block 85. Secured to the outer end of phalanx 66 is one end of a rope or cable 86, which is passed from thence around pulley 69', thence around pulley 65, thence upward through one of the snatch-blocks 84, thence down through one-half of snatch-block 85, thence doubled upon itself, passing through a movable snatch-block 87, back through the other side of snatch-block 85, thence upward through the other snatch-block 84, thence downward around pulley 71 and through phalanx 69 (which is of skeleton form as shown in Fig. 3) thence around pulley 75 (between the periphery of said pulley and the face of phalanx 72), thence around pulley 79, and from thence to the outer end of phalanx 80 to which it is secured.

Secured to the movable snatch-block 87 is a cable 88 which passes thence around an idler 89 and through a movable snatch-block 90, and from thence to and several times around a drum 91 mounted upon a suitable shaft 92 supported upon frame 25. Cable 88 has secured to it, at a point between snatch-block 90 and drum 91, a button 93 which cannot pass between the pulley and its housing. Drum 91 is yieldingly held by a spring 94 which normally tends to keep cable 88 wound upon it, and said drum is provided with a plurality of pins 95 any one of which may be engaged by an arm 96 carried by a rock-shaft 97 mounted upon frame 25. Rock-shaft 97 may be operated, so as to swing arm 96 into or out of the path of movement of pins 95 and thus prevent further rotation of the drum, by means of a link 98 and an operating lever 99 mounted adjacent seat 100.

Figures 4, 17, 18:
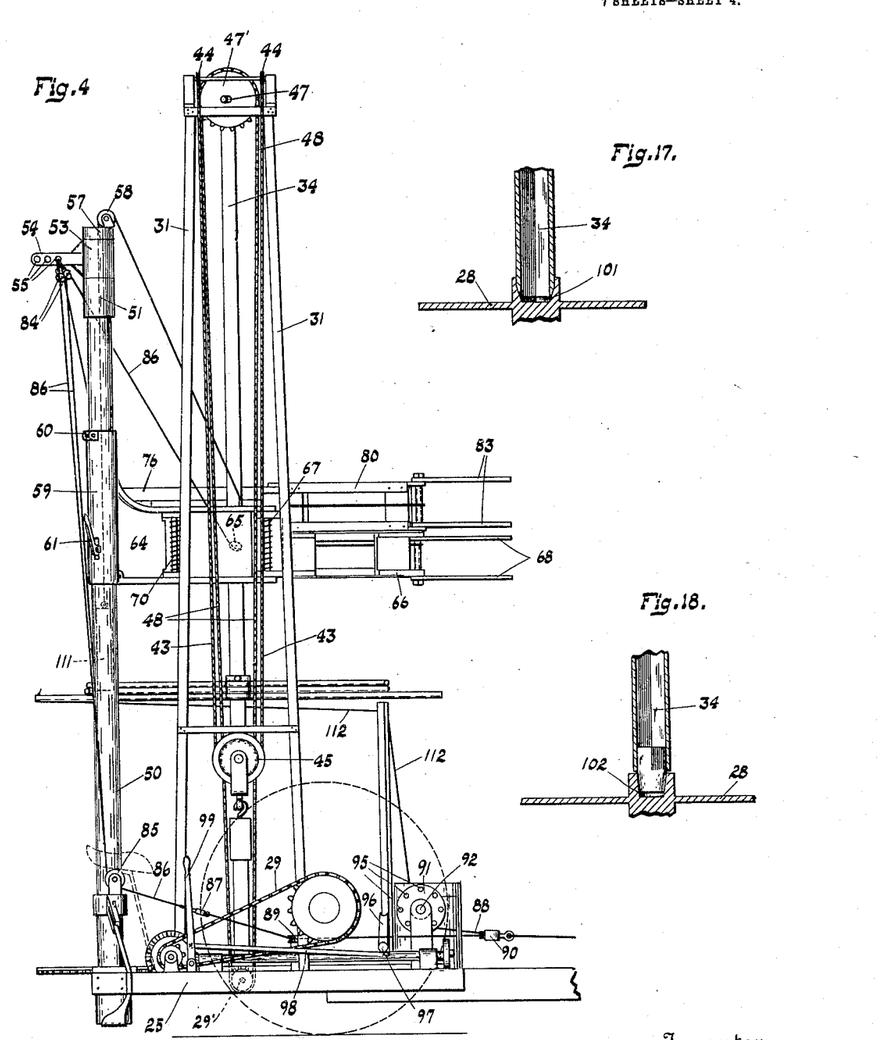
Fig. 4 a side elevation from the "bull-wheel" side.
Fig. 17 a vertical sectional detail of one form of connection between the table and central core.
Fig. 18 a similar view of another form.

As previously stated, the core 34, rotatably connected as it is to gear 33, may be driven by positive engagement with a central socket 101 (as illustrated in Fig. 17) carried by the table 28, or, if desired, may be independently driven, by the mechanism already described. If absolute independence of driving is desired, core 34 rests in a socket 102 carried by the table 28, as shown in Fig. 18, said socket preventing displacement of the lower end of the core.

Figures 11, 12, 13, 14:
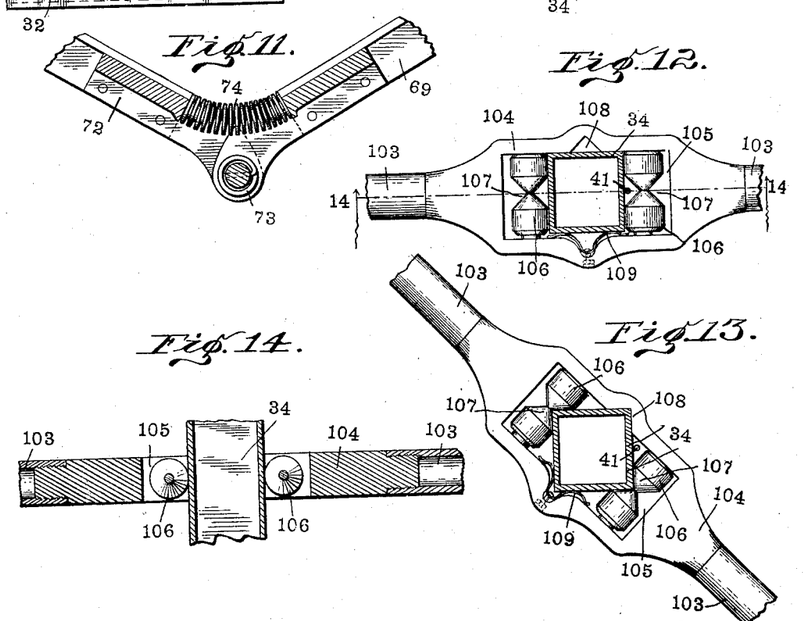
Fig. 11 an enlarged horizontal section of the joint between two adjacent phalanges of the compressing and lifting mechanism.
Fig. 12 a horizontal detail of one of the supporting cross-arms.
Fig. 13 a similar view showing a second possible position of the arm with relation to the central mast.
Fig. 14 a section on line 14—14 of Fig. 12.

In any case it is practically essential, in order to insure the proper vertical placement of the cut stalks, that there be a plurality of radiating arms 103 at a point some distance above the table to be rotated in the same direction as said table, either at exactly the same speed or at such variance therefrom as may be found to be necessary to insure the proper vertical positioning of the stalks. In the drawings, I have shown such arms carried by the core 34 which consists of a piece of square tubing. In order to allow for a radiating arm, each forty-five degrees I have provided the construction shown in Figs. 12 and 13. Here the central portion of each arm is composed of a casing 104 having a central opening 105 within which I mount two sets of rollers 106 each of which is provided at its middle with a rectangular peripheral notch 107. Rollers 106 are so spaced apart that the distance between their peripheries is equal to the cross-dimension of the tubular core 34, while the distance between the notches 107 is substantially equal to the diagonal of the core. Between the two rollers 106 the opening 105 is provided with a right angled extension 108 adapted to receive one corner of the core 34 when the arm is placed in the position shown in Fig. 13, and opposite this notch I mount a spring 109 having a pair of divergent ends, the arrangement being such that said spring will engage either a corner of the core, as shown in Fig. 13, or a side of the core as shown in Fig. 12.

The weight of the compressing and lifting mechanism may be partially supported if desired by a counter-weight 111 within mast 50 (shown in dotted lines in Fig. 4), the cord being secured at one end to said counterweight and passed over pulley 58, and from thence to the arm 64.

In the drawings I have shown provision for carrying out the process of binding a shock, which forms the subject-matter of claim 7 in my Patent No. 432,750, the twine 112 passing from twine box 113 through a guiding pulley 114, and from thence being secured to one end of one of the arms 103 so as to be wrapped around volutions of stalks as they are gathered upon the table.

Figure 1:
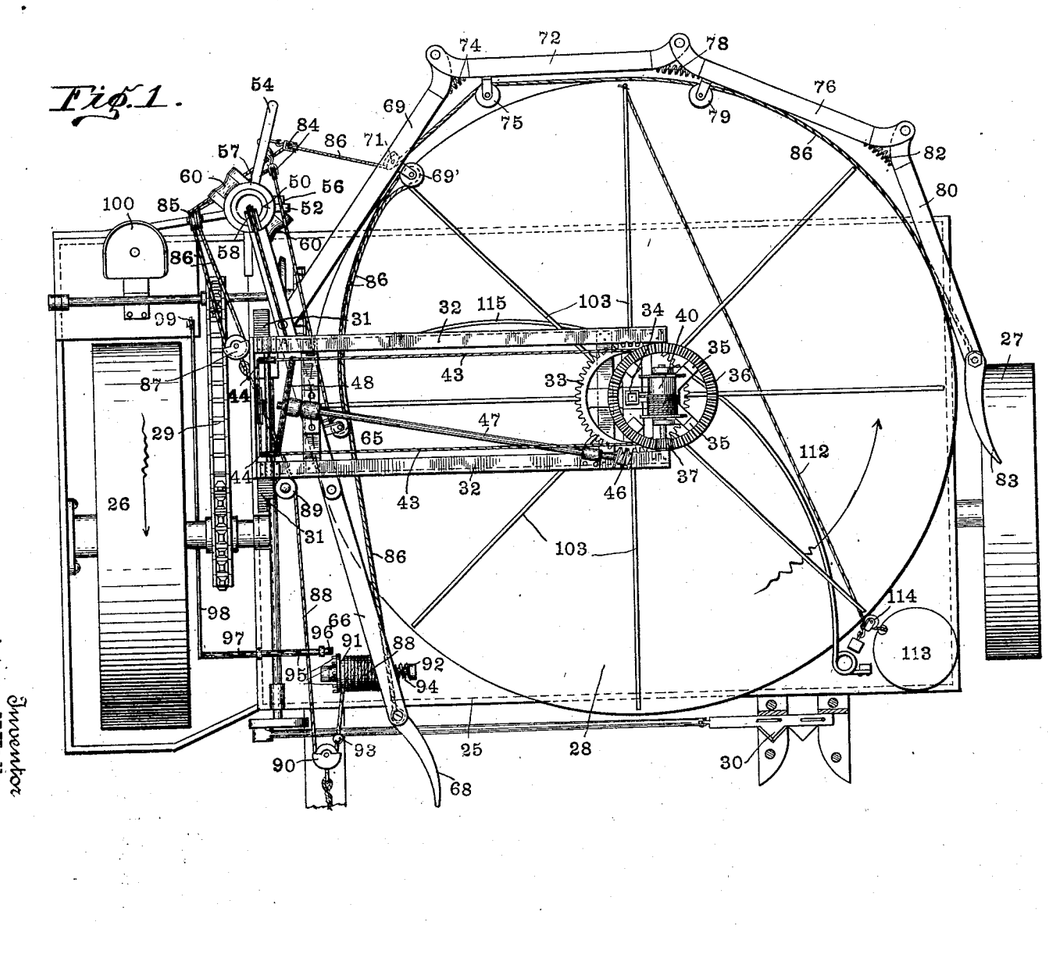
Figure 1 is a plan of a corn harvester embodying my invention with the parts in receiving position.
Figure 2:
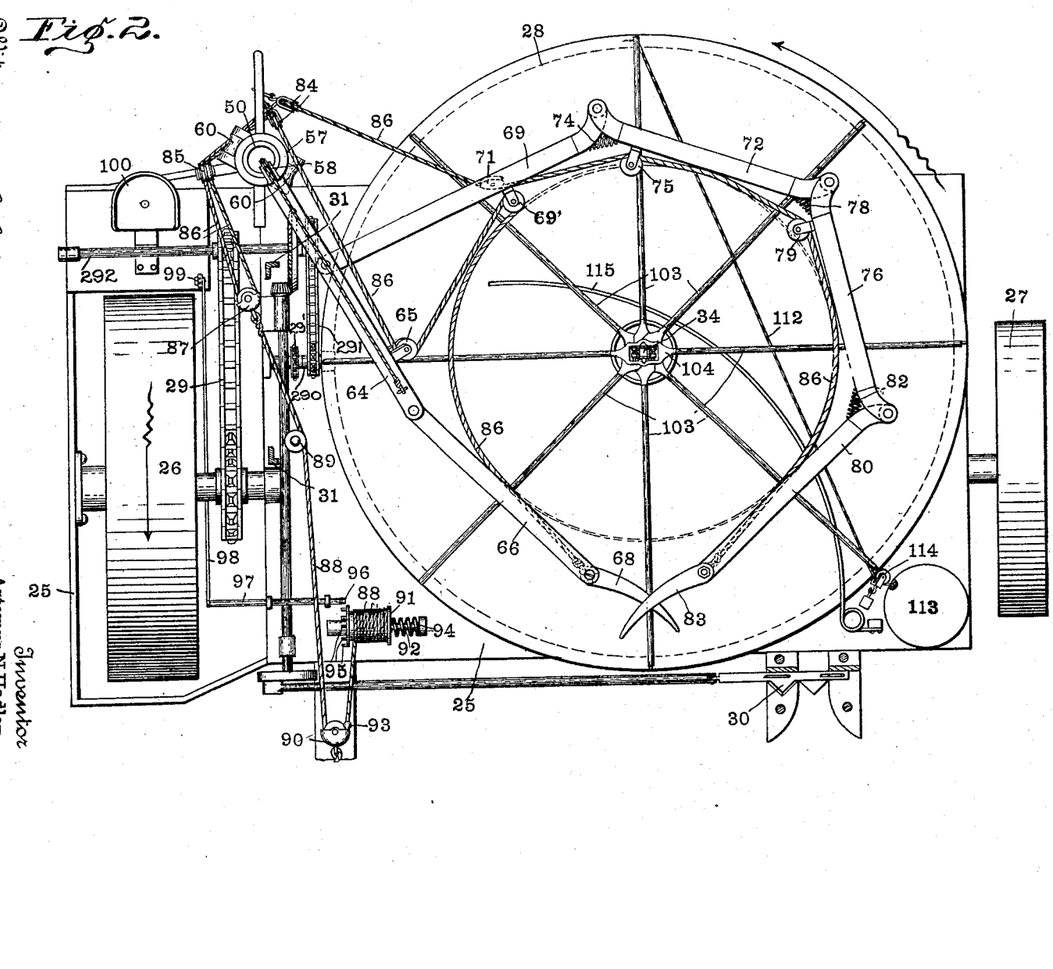
Fig. 2 is a similar view showing the lifting and compressing mechanism in positions assumed at the time of completion of the shock.
Figure 5:
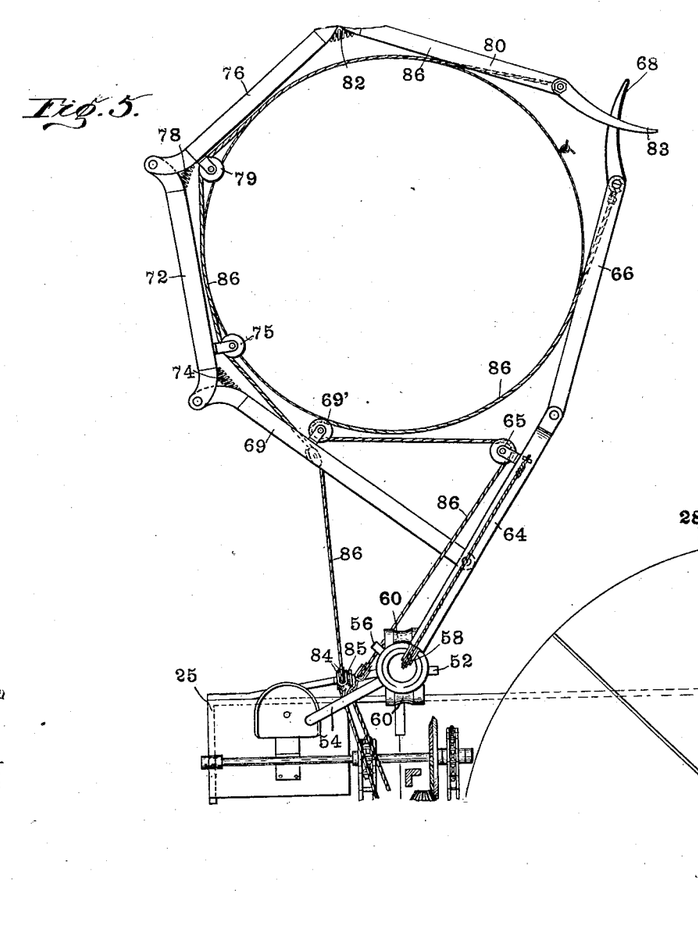
Fig. 5 a plan showing the parts in the positions assumed at the time the shock is deposited upon the ground.
Figures 6, 7:
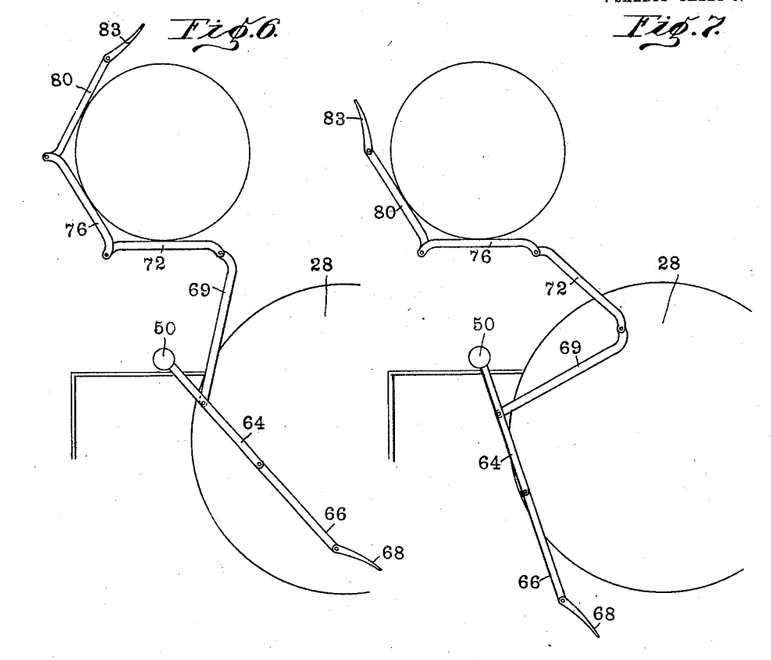
Figs. 6, 7, and 8, successive diagrammatic views showing the movement of the parts of the lifting mechanism from depositing position to receiving position.
Figure 8:
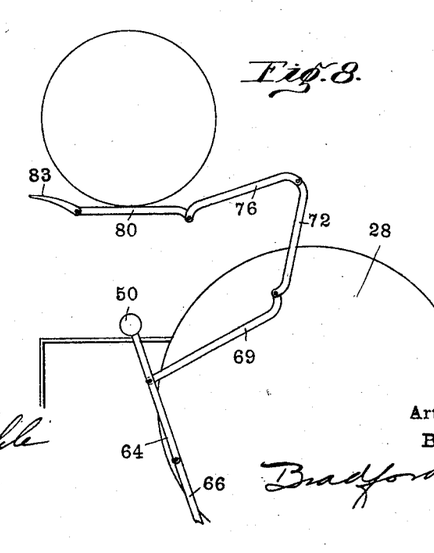
Figure 9:
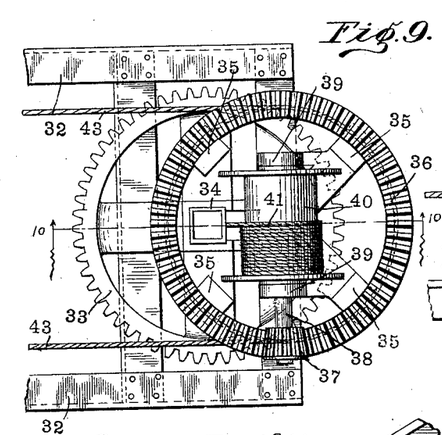
Fig. 9 a detail plan of the means for removing the central core or post.
Figure 10:
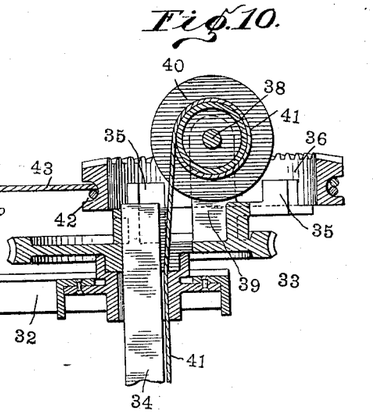
Fig. 10 a section on line 10—10 of Fig. 9.

In operation, the several parts normally assume the position shown in Fig. 1, and, as the machine is drawn forward over the ground with the cutting mechanism 30 in position to engage a row of stalks, the cut stalks pass to the rear and upon table 28, being forced toward the center by means of the spring arm 115 or other suitable means, and being carried around by the positive rotation of the table 28 and arms 103. When a sufficient quantity of stalks has been deposited upon the table to form a shock, (the shock having been formed by the continuous movement of stalks upon the table as the table revolves), the operator stops the machine, disconnects the doubletrees (not shown) from the tongue, and connects them to the snatch-block 90, and a pull upon said snatch-block pulls both ends of cable 88, button 93 preventing any movement of the cable through the snatch-block, and exerts a pull upon snatch-block 87, which thus pulls upon cable 86 so as to draw the several phalanges together, in the manner of the movement of the thumb and finger of a hand, into the position shown in Fig. 2, thus compressing the shock, and tip 83 of phalanx 80 passing over tip 68 of phalanx 66 and being supported thereby. It may be that, before the parts can be brought to this position, the force required is greater than that which can be exerted with a team, in which case the operator may, by swinging lever 99, throw arm 96 into the path of movement of pins 95, and thus hold the drum 91 to prevent any further unwinding of cable 88 therefrom, whereupon the snatch-block 90 becomes movable with relation to the cable 88, and thus double the effective force upon the snatch-block 87. When the parts have been brought to the position shown in Fig. 2 a sufficient quantity of twine 112 may be drawn from twine box 113 to pass once again around the shock. As soon as the phalanges have been brought to the position shown in Fig. 2, or before this time if desired, the core 34 is drawn upward out of the shock, and through gear 33, by a pull in the proper direction upon cable 43, so as to rotate gear ring 36, and thus rotate drum 40, the said core being drawn upward out of and away from the arms 103 and said arms remaining in the shock. During the rotation of the table 28 and the formation of the shock, the drum 40 has been carried bodily around the center of gear 33 without any rotation upon its own axis, the weight idler 45 compensating for difference in length necessary in the cable 43. When the core 34 has been withdrawn from the shock, and after the shock has been compressed in the manner described, sleeve 59 is released from mast 50 by the withdrawal of the cam-lever 61, and a further forward pull of the team will raise sleeve 59 upon mast 50, the shock being embraced by the articulated phalanges, and raised thereby off from the table, and as soon as this occurs the action of cable 86, between snatch-blocks 84 and pulleys 65 and 71, is such as to automatically swing the whole device, together with the shock, around mast 50, so that thereafter, by backing the team, or otherwise releasing the same the shock may be deposited upon the ground in the relative position shown in Fig. 5, whereupon the several phalanges will be spread by springs 74, 78 and 82, and may then be swung back to initial position, as illustrated diagrammatically in Figs. 6, 7 and 8. Arms 103 may then be drawn radially from the shock and replaced upon the core 34 which may be lowered to operative position by a pull in the proper direction on cable 43.

I claim as my invention:

1. A shock handling mechanism consisting of two sets of opposed articulated phalanges, means for swinging said phalanges about their articulations to embrace a shock, and means for lifting and transferring said phalanges and the embraced shock.

2. The combination, in a harvester, of a rotatable shock forming table, means for rotating the table, a stalk supporting core rotatable in the direction of rotation of the table, a pair of opposed members arranged above said table, one of said members consisting of articulated phalanges means for clamping said members about a shock on said table, and means for shifting said members with the embraced shock to remove said shock from the table.

3. The combination, in a harvester, of a rotatable shock forming table, a stalk supporting core arranged above said table to be rotated in the same direction as said table, a pair of opposed members, one of which consists of articulated phalanges arranged above the table and normally maintained around the stalk support to form an external stalk retainer, means for clamping said members about a shock on said table, and means for shifting said members and the embraced shock to remove said shock from the table.

4. The combination, in a harvester, of a rotatable shock forming table, means for rotating said table, a central stalk supporting core arranged above said table, means for rotating said support in the same direction that the table is rotated, two sets of opposed articulated phalanges mounted above the table and partially surrounding the central support, means for swinging said phalanges about their articulation to embrace a shock on said table, and means for transferring said members so as to remove the shock from the table.

5. The combination, in a harvester, of a rotatable shock forming table, two sets of articulated phalanges arranged above said table, means for holding the ends of said sets of phalanges separated to permit the passage of a cut crop onto the table, means for swinging said phalanges upon their articulations so as to cause them to embrace a shock upon the table, and means for shifting said phalanges to remove an embraced shock from the table.

6. The combination, in a harvester, of a rotatable shock forming table, two opposed sets of articulated phalanges arranged above said table, means for holding the ends of said sets of phalanges separated to permit the entrance of a cut crop upon the table, and means for swinging said phalanges upon their articulations so as to cause them to embrace a shock upon the table.

7. In a harvester, the combination, with shock forming mechanism, of a shock embracing and lifting mechanism consisting of two opposed sets of articulated phalanges, and means for clamping said phalanges about a shock and for lifting and transferring said shock by means of said phalanges.

8. The combination, in a harvester, of a rotatable shock forming table, means for rotating said table, a mast erected to one side of said table, an arm sleeved upon said mast for vertical and angular movement thereon, two opposed sets of articulated phalanges carried by said arm above the table, means for swinging said phalanges upon their articulations to embrace a shock formed upon the table, and means for moving the arm upon the mast so as to lift the shock and transfer it from the table.

9. In a shock handling mechanism, the combination, with a supporting mast, of an arm mounted thereon, two sets of phalanges articulated with said arm, and means for swinging said phalanges upon their articulations to bring the ends thereof toward each other to embrace and hold a shock.

10. In a shock handling mechanism, the combination, with a supporting mast and an arm carried thereby, of a set of articulated phalanges pivotally supported upon said arm, a phalanx articulated upon the arm in opposition to the before mentioned set of phalanges, cable guides carried by the several phalanges, and a single cable secured at its ends to the two extreme opposed phalanges and extended around the several guides whereby a pull upon the bight of said cable will serve to swing said phalanges upon their articulations and bring the opposed extreme phalanges together.

11. In a harvester, the combination, with a rotatable shock forming table, of a stalk supporting core, a support for said core arranged above said table and through which the core may be vertically moved, and means for vertically withdrawing said core from the table through the support.

12. In a harvester, the combination, with a rotatable shock forming table, of a stalk supporting core, a support for said core extended over the table, a connection between said core and support permitting both vertical and rotative movements of the core through the support, means for causing the rotation of said core in the same direction as the rotation of the table, and means for vertically withdrawing said core through the support and away from the table.

13. A shock compressing and lifting mechanism consisting of a multiplicity of successively articulated phalanges, means for swinging said phalanges inwardly, beginning with one extreme, each upon its articulation with the preceding phalanx, and means for lifting and shifting said phalanges to transfer an embraced shock.

14. A shock compressing and lifting mechanism consisting of a multiplicity of successively articulated phalanges, means for swinging said phalanges each upon its articulation with its predecessor to bring the two outer phalanges toward each other, and means for lifting and shifting said phalanges to lift and shift an embraced shock.

15. A shock compressing and lifting mechanism consisting of two sets of opposed articulated phalanges, means for swinging said phalanges inwardly, each upon its articulation with its predecessor to bring the two outer phalanges toward each other and reduce the dimensions between the opposed sets, and means for lifting and shifting said phalanges to lift and shift an embraced shock.

16. In a harvester, the combination, with shock forming mechanism, of a multiplicity of successively articulated phalanges to embrace said shock, and means for swinging said phalanges inwardly, beginning with one extreme, each upon its articulation with the preceding phalanx.

17. In a harvester, the combination, with shock forming mechanism, of a multiplicity of successively articulated phalanges, and means for swinging said phalanges, each upon its articulation with its predecessor, to bring the two outer phalanges toward each other.

18. In a harvester, the combination, with shock forming mechanism, of two sets of opposed articulated phalanges, and means for swinging said phalanges inwardly, each on the articulation with its predecessor, to bring the two outer phalanges toward each other and to reduce the dimensions between the opposed sets.

19. In a harvester, the combination, with shock forming mechanism, of a multiplicity of successively articulated phalanges, means for swinging said phalanges inwardly, beginning with one extreme, each upon its articulation with the preceding phalanx, and means for lifting and shifting said phalanges to transfer an embraced shock from the forming mechanism.

20. In a harvester, the combination, with shock forming mechanism, of a multiplicity of successively articulated phalanges, means for swinging said phalanges each upon the articulation of its predecessor to bring the two outer phalanges toward each other, and means for lifting and shifting said phalanges to lift and shift an embraced shock from the forming mechanism.

21. In a harvester, the combination, with shock forming mechanism, of two sets of opposed articulated phalanges, means for swinging said phalanges inwardly, each upon the articulation with its predecessor, to bring the two outer phalanges toward each other and reduce the dimensions between the opposed sets, and means for lifting and shifting said phalanges to lift and shift an embraced shock from the forming mechanism.

22. In a harvester, the combination, with a rotatable shock forming table and means for rotating the same, of a stalk supporting core arranged above the center of said table, a support for said core above the table, means for vertically withdrawing said core from the table through its support, and means for positively driving said core independently of the table and in the same direction.

23. In a harvester, the combination, with a rotatable shock forming table and means for rotating the same, of a stalk supporting core arranged above the center of said table, a support for said core above the table, means for vertically withdrawing said core from the table through its support, and means for positively driving said core from its upper end independently of the table and in the same direction.

24. In a harvester, the combination, with a rotatable shock forming table and means for rotating the same, of a stalk supporting core arranged above the center of said table, a support for said core above the table, means for withdrawing said core vertically from the table through its support, means for positively driving said core independently of the table and in the same direction, and a plurality of arms carried by said core and radiating therefrom above the table.

25. In a harvester, the combination, with a rotatable shock forming table and means for rotating the same, of a stalk supporting core arranged above the center of said table, a support for said core above the table, means for withdrawing said core vertically from the table through its support, means for positively driving said core from its upper end independently of the table and in the same direction, and a plurality of arms carried by said core and radiating therefrom above the table.

26. In a harvester, the combination, with a rotatable shock forming table and means for rotating the same, of a stalk supporting core arranged above the center of said table, a support for said core above the table, means for withdrawing said core from the table through its support, means for positively driving said core independently of the table and in the same direction, and a plurality of radiating arms detachably mounted upon the core above the table through which the core may be drawn vertically when the shock has been formed.

27. A stalk receiving arm, for shock forming mechanism, said arm having a central perforated portion through which a supporting core may pass, and opposed notched pulleys carried at opposite sides of the opening in the arm to engage with the sides or corners of the core.

28. A stalk receiving arm, for shock forming mechanism, said arm having a central perforated portion through which a supporting core may pass, opposed notched pulleys carried at opposite sides of the opening in the arm to engage with the sides or corners of the core, and a spring mounted between the rollers and adapted to engage with one side or one corner of the core.

29. In a harvester, the combination, with a rotatable shock forming table, of a core support arranged above said table, a core vertically movable through said support, a planetary winding drum mounted upon the support and connected with the core so as to rotate therewith, and means for rotating said drum upon its own axis.

30. In a harvester, the combination, with a rotatable shock forming table, of a core support mounted above said table, a core vertically movable through said support toward and from the table, a driving drum support mounted upon the first named support so as to rotate thereon and connected to the core so as to permit vertical movement of the core thereto, a winding drum rotatably mounted upon said drum support, a pinion carried by said winding drum, a driving gear rotatably mounted upon the drum support to engage said pinion, means for rotating said driving gear, and a connection between the winding drum and the core.

31. In a harvester, the combination, with a rotatable shock forming table, of a core support mounted above said table, a core-driving gear rotatably mounted upon said support, a core vertically movable toward and from the table through the core support and gear, a winding drum carried by said core-driving gear eccentrically thereto, a connection between said winding drum and core, a pinion carried by the winding drum, a drum driving gear rotatably mounted on the core-driving gear eccentrically thereto, and a driving cable engaging said drum-driving-gear passing from thence to the support, and means for compensating in the driving cable for the eccentricity of support of the drum-driving-gear.

32. In a harvester, the combination, with a rotatable shock-forming table and means for rotating the same, of a stalk supporting core centrally supported above the table, and means for driving said core in the same direction as the table from a point above the table.

33. In a harvester, the combination, with a rotatable shock-forming table and means for rotating the same, of a stalk-support arranged above said table, a support for said stalk-support arranged above the table, means for rotating the stalk support from its upper end, and means for withdrawing the stalk-support from a shock.

34. In a shock forming mechanism, the combination, with a shock-supporting core having a polygonal cross section, of a plurality of stalk-receiving arms each having a central perforated portion through which the core may pass, and opposed notched pulleys carried at opposite sides of the opening in the arm to engage with the sides or corners of the core.

35. In a shock forming mechanism, the combination, with a shock-supporting core having a polygonal cross section, of a plurality of arms each having a central perforated portion through which the core may pass, opposed notched pulleys at opposite sides of the opening in the arm to engage with the sides or corners of the core, and a spring mounted between the rollers and adapted to engage with one side or one corner of the core.

36. The combination, in a harvester, of a rotatable shock forming table, a pair of shock embracing members arranged above the table and one of said members consisting of a plurality of articulated phalanges, means for holding the ends of said members separated to permit the entrance of a cut crop upon the table, and means for swinging the said phalanges upon their articulations so as to cause them to embrace a shock upon the table.

37. In a harvester, the combination, with shock forming mechanism, of a shock embracing and lifting mechanism consisting of two opposed members one of which consists of a plurality of articulated phalanges, and means for clamping said members about a shock and for lifting and transferring said shock by means of said members.

38. The combination, in a harvester, of a rotatable shock forming table, means for constantly rotating the table, a stalk supporting core rotatable in the direction of rotation of the table, a pair of opposed members, one of which consists of articulated phalanges, arranged above the table and normally maintained around the stalk support to form an external stalk retainer, means for clamping said members about a shock on said table, and means for shifting said members and the embraced shock to remove said shock from the table.

In witness whereof, I, have hereunto set my hand and seal at Indianapolis, Indiana, this 16th day of January, A. D. one thousand nine hundred and three.

ARTEMUS N. HADLEY. [L. S.]

Witnesses:
ARTHUR M. HOOD,
JAMES A. WALSH.